United States Patent [19]

McDonough et al.

[11] 4,234,370
[45] Nov. 18, 1980

[54] METHOD FOR RECAPPING TIRES

[75] Inventors: John C. McDonough, Essex Fells; James K. Rary, Orange; Arden Birth, Lake Parsippany; John J. Kuzma, Jr., Wharton, all of N.J.

[73] Assignee: Bandag, Incorporated, Muscatine, Iowa

[21] Appl. No.: 974,252

[22] Filed: Dec. 29, 1978

Related U.S. Application Data

[62] Division of Ser. No. 844,788, Oct. 25, 1977, Pat. No. 4,157,727.

[51] Int. Cl.² ........................................... B29H 17/36
[52] U.S. Cl. ...................................... 156/95; 156/96; 156/128 R
[58] Field of Search ............. 157/13; 408/54; 409/56, 409/304, 902; 156/95, 96, 126-130

[56] References Cited

U.S. PATENT DOCUMENTS

| 2,192,130 | 2/1940 | Errig et al. | 157/13 |
| 3,472,714 | 10/1969 | Ragan | 157/13 UX |
| 3,502,131 | 3/1970 | Rawls | 157/13 |
| 3,701,296 | 10/1972 | Snow | 157/13 X |
| 3,850,222 | 11/1974 | Lejuene | 157/13 |
| 3,999,589 | 12/1976 | Meacheam | 157/13 |
| 4,080,230 | 3/1978 | Batchelor et al. | 157/13 X |
| 4,081,017 | 3/1978 | Appleby et al. | 157/13 |
| 4,157,727 | 6/1979 | McDonough et al. | 157/13 |

Primary Examiner—John E. Kittle

[57] ABSTRACT

Apparatus and method for recapping tires, particularly of the type used on off-the-road vehicles. Rubber strips are applied to the prepared tread surface of the tire to "smooth" the tire, after which the tire is disposed on a roller assembly to cut i.e., "groove" a tread design in the tire. The roller assembly is hydraulically displaced to dispose the tire in a pit and is rotated for indexing the tire to groove the circumference thereof. A grooving blade is heated to a controlled temperature and is hydraulically pulled across the tread surface to cut the tread grooves.

8 Claims, 5 Drawing Figures

METHOD FOR RECAPPING TIRES

This application is a Division of Ser. No. 844,788 filed Oct. 25, 1977, now U.S. Pat. No. 4,157,727.

BACKGROUND OF THE INVENTION

1. Field of the Invention

This invention relates to apparatus and method for recapping tires and particularly to apparatus and method for recapping large tires used on off-the-road vehicles or the like. More particularly, this invention relates to apparatus and method of the type described which facilitates recapping of tires by minimizing the manual effort to accomplish same.

2. Description of the Prior Art

Recapping tires of the type described requires two separate and distinct operations. One operation involves applying sufficient rubber to a previously prepared tire carcass so that the tire may be retreaded. This is referred to in the art as "smoothing". The other operation involves cutting the tread design. This is known in the art as "grooving" or "sculpturing". For purposes of describing the present invention "smoothing" and "grooving" will be hereinafter referred to.

Smoothing and grooving of the tire carcass as heretofore defined is accomplished in various ways. U.S. Pat. No. 3,808,076 issued on Apr. 30, 1974 to John Harold Barwell discloses a method of applying tread material to tires in which the tread material is extruded under pressure directly onto the periphery of the tire to bond the material to the tire. A tread pattern can be formed in the material as it is extruded.

U.S. Pat. No. 3,753,821 issued on Aug. 21, 1973 to Bradley E. Ragan describes a method of retreading tires wherein a cured rubber tread is vulcanized to a tire carcass.

Applying rubber to a tire carcass and then cutting a tread design into the rubber is described in U.S. Pat. No. 3,472,714 issued on Oct. 14, 1969 to Bradley E. Ragan. This patent describes rebuilding a lugged tire tread on a previously used tire carcass in which a plurality of adhered together convolutions of uncured rubber stock are built up about a smooth periphery surface of the tire carcass, and circumferentially spaced apart transversely extending portions are thereafter removed from some of the convolutions by a knife or the like so as to define a lugged tire tread.

Finally, U.S. Pat. No. 3,850,222 issued on Nov. 26, 1974 to Daniel Lejuene describes a tool for cutting grooves in a tire tread, wherein the tool is heated and drive means of the type including a hydraulic jack is coupled to the tool for hauling the tool through the tread to cut the grooves.

The apparatus and methods described in the aforenoted patents, while utimately accomplishing the purposes intended, do not do so in the efficient manner of the present invention whereby the manual effort required is minimized as will be seen from the description of the invention to follow.

SUMMARY OF THE INVENTION

The present invention contemplates apparatus and method for recapping tires, wherein the tire is prepared by buffing, skiving, filling tread cuts and cementing as is commonly known in the art. The tire is smoothed by applying rubber to the tire in strips substantially wider than the desired tread design. A splice is made on each strip at a 45 degree angle. The strip is then rolled on the tire tread surface and suitably cemented thereon. The strips are applied one at a time until the proper thickness of rubber is attained. The rubber is then trimmed to conform to the tread design required. In accordance with the invention, the tire is grooved by using a roller assembly coupled to hydraulic means so as to be displaced longitudinally over a pit which receives the tire supported on a pair of rollers of the roller assembly. A motor driven transmission is arranged to rotate the rollers whereby the tire is sequentially indexed from one position to the next for grooving a tread design around the tire circumference. The grooving of the tire is accomplished with a heated blade, the temperature of which is controlled by a thermocouple, coupled to a hydraulic system for being pulled a predetermined distance across the tread surface of the tire. The depth and width of the grooving blade is adjustable in accordance with the desired depth and width of the groove forming the tire tread. After the tire has been grooved, it is cured in an open chamber as is well known in the art.

The main object of this invention is to provide novel apparatus and method for recapping tires, and particularly for recapping large tires such as used on off-the-road vehicles.

Another object of the invention is to accomplish the above by smoothing the tire, i.e. adding rubber to a previously prepared tire tread surface and by grooving the tire, i.e. cutting a tread design in the tread surface.

Another object of this invention is to accomplish the grooving by using hydraulically driven means to position the tire in a pit, motor driven means for indexing the tire so that the grooving is accomplished about the circumference thereof and hydraulically driven means for pulling a heated grooving blade a predetermined distance across the tire tread surface to cut the grooves.

Another object of this invention is to control the depth, width and length of the groove being cut.

Another object of this invention is to control the temperature of the grooving blade in accordance with the particular characteristics of the tire being processed.

Another object of this invention is to provide apparatus and method as described which is more efficient and requires minimal manual effort as compared to the prior art.

The aforegoing objects and advantages of the invention will appear more fully hereinafter from a consideration of the detailed description which follows taken together with the accompanying drawings wherein a single embodiment of the invention is illustrated by way of example. It is to be expressly understood, however, that the drawings are for illustration purposes only and are not to be construed as defining the limits of the invention, reference being had to the appended claims for that purpose.

DESCRIPTION OF THE INVENTION

Figure 1:
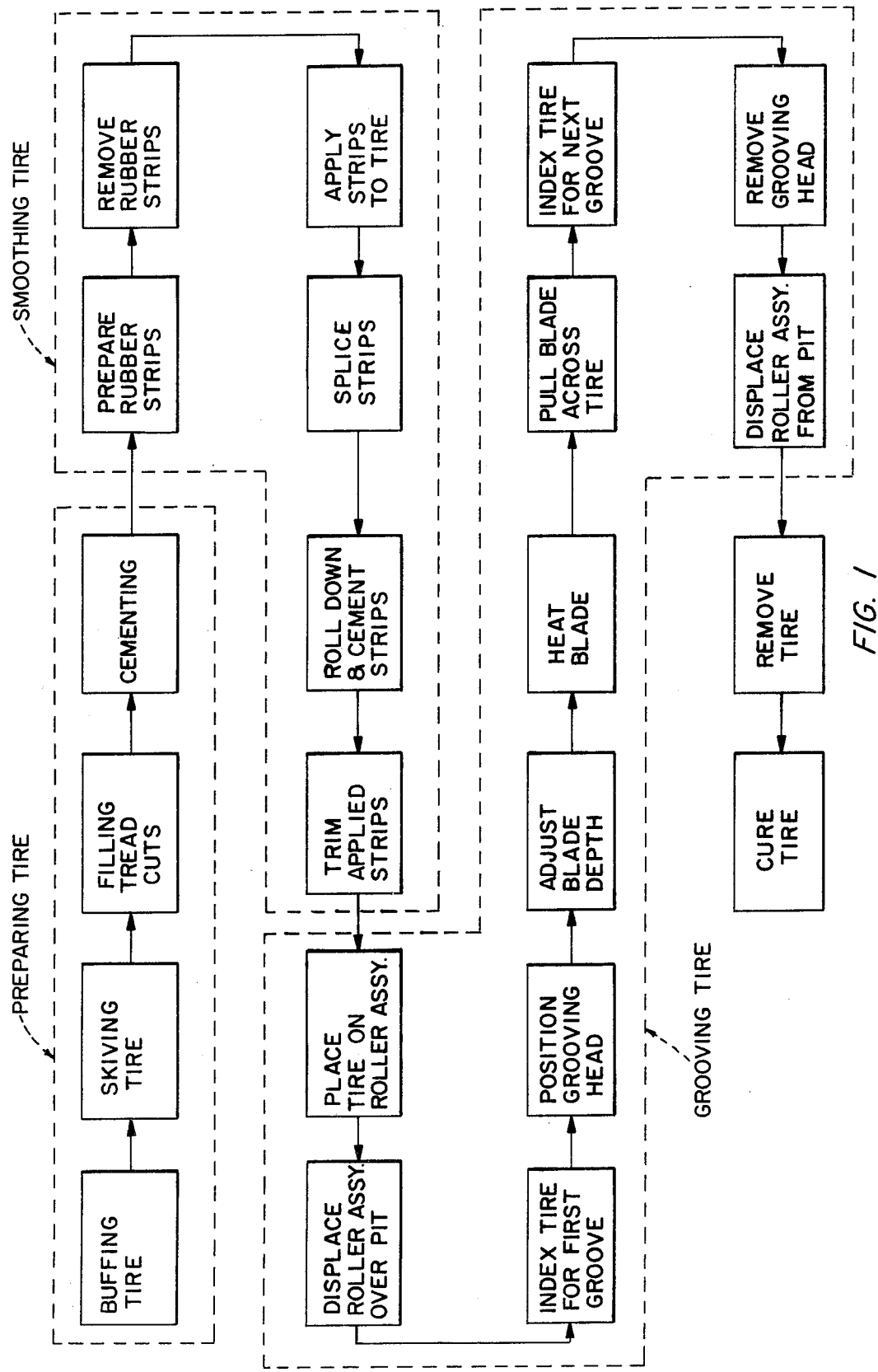
FIG. 1 is a flow chart illustrating the steps in practicing the method of the invention.

Referring to the drawings, the method of the invention will be described generally with reference to the flow chart of FIG. 1 and then the apparatus involved will be described with reference to FIGS. 2, 3, 4 and 5.

It is to be first noted that the method and apparatus to be herein described finds its greatest utility in connection with recapping of large tires for off-the-road vehicles such as used in road construction equipment, strip mining or the like. However, the invention may be used equally as well for recapping all tires as will be understood from the description to follow.

Referring now particularly to FIG. 1, the method of the present invention includes certain steps culminating in a retreaded tire which is then cured in an open chamber. The steps may be broadly characterized as preparing the tire, smoothing the tire and grooving the tire.

The tire is prepared by buffing, skiving (removing foreign material) filling tread cuts and cementing, the same being well known in the tire recapping art. After the tire has been so prepared the smoothing and grooving process takes place.

The tire is smoothed using rubber which has been previously prepared in a conventional manner and carried on a roller or the like, and removed therefrom in strips of approximately ¾ of an inch thickness and approximately three to four inches wider than the tread design of the particular tire. The strips are removed from the roller one at a time and applied to the circumference of the tire tread surface. A splice is made on the strip at a 45 degree angle, whereby the opposite ends of the strip are joined. The strip is rolled down and cemented on the tire tread surface and then trimmed to conform to the tread design required. It is to be emphasized that the strips are applied one at a time until the proper thickness of rubber is attained for the ensuing grooving process.

The tire is grooved by first placing the tire on a roller assembly as will be described with reference to FIGS. 2, 3 and 4. The tire, so placed on the roller assembly, has its lower portion disposed in a pit. The roller assembly is hydraulically operated to span the pit for purposes which will hereinafter become evident.

The tire is next indexed so as to be positioned for cutting a first groove in the tread surface. The indexing is accomplished through a motor driven transmission which controls the clockwise or counterclockwise rotation of the tire as may be desired and as will be hereinafter explained with reference to FIGS. 2, 3, and 4. A grooving head is positioned on the indexed tire. The grooving head, specifically described with reference to FIG. 5, includes a blade for cutting the desired groove. The blade is adjustable to accommodate the groove width and depth desired and is heated to a controlled temperature.

With the blade appropriately adjusted and heated and positioned on the indexed tire, the grooving head is pulled across the tire tread surface a predetermined distance by hydraulic means for cutting the groove. After the groove has been cut, the tire is indexed to the next sequential grooving position and the grooving process as aforenoted is repeated.

After the circumference of the tire has been grooved the grooving head is removed from the tread surface, the roller assembly is displaced away from the pit and the tire is removed therefrom. The tire is then cured in an open chamber as is well known in the art.

The grooving operation and the apparatus therefor is specifically described with reference to FIGS. 2-5, wherein corresponding elements carrying corresponding numerical designations. With reference first to FIGS. 2 and 3, a transformer 2 is connected by suitable conductors 4 to a grooving head designated generally by the numeral 6, and which will be described in further detail with reference to FIG. 5. Transformer 2 receives a relatively low current input and transforms same to a high current output for heating a blade portion 7 of the grooving head as will be hereinafter described. The transformer is of the type which may have a fan 2A for providing a cooling effect as best shown in FIG. 3.

A hydraulic cylinder 8 operator-operated by a hand valve 9 has a ram or arm 8A coupled to grooving head 6 and is arranged to pull the grooving head across a prepared, smoothed tread surface 11 of a tire 13 a predetermined distance determined by adjusting the travel of ram 8A to cut a groove 15 of a desired length. An arm 10 is mounted on hydraulic cylinder 8 so as to be longitudinally displaceable therealong, and which arm 10 carries a plate 14 for exerting a force against a side wall 21 of tire 13 as will be further explained. Hydraulic cylinder 8 is powered by a motor-pump assembly 16 including a suitable liquid reservoir. The motor-pump assembly is connected to the hydraulic cylinder by suitable hydraulic lines 17.

A platform 18 is arranged near a pit 19 (FIG. 3) which receives tire 13. Platform 18 includes a roller assembly 21 having a pair of parallel rollers 20 and 22, and which roller assembly 21 is displaced from platform 18 by hydraulic means 24 operator-operated by a hand valve 26 (FIG. 3) for forward and reverse displacement over the pit as shown by arrows (a) and (b), respectively.

Rollers 20 and 22 are suitably journalled in assembly 21 at 23 and are rotated in either clockwise or counterclockwise directions by an electric motor and gear box assembly 28 coupled thereto and operator-operated by a suitable switch (not shown). The clockwise or counterclockwise rotation of rollers 20 and 22 has the effect of positioning or indexing the tire for cutting and spacing grooves 15 as required.

Figure 4:
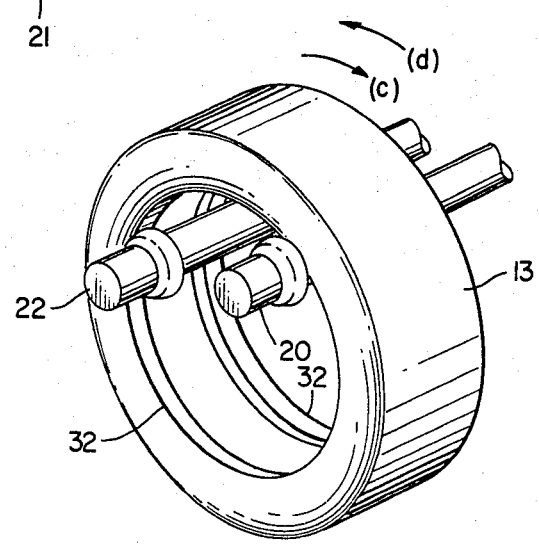
FIG. 4 is a diagrammatic representation illustrating the rollers of the apparatus shown in FIGS. 2 and 3 for supporting a tire in accordance with the invention, whereby rotation of the rollers effects rotation of the tire to index the tire from one position to the next.

In this connection reference is made to FIG. 4 wherein tire 13 is shown disposed over rollers 20 and 22, with the beads 32 of the tire in contact with the rollers. The tire is suspended on the rollers in pit 19 with the weight of the tire on the rollers so that rotation of the rollers in either direction as shown by arrows (c) and (d) has the effect of rotating or indexing the tire as aforenoted. Motor and gear box assembly 28 include suitable gear reduction means so that the actual rotation of the rollers and the ensuing indexing of the tire from one position to the next is at a relatively slow speed as is desired and as will be understood by those skilled in the art.

Figure 3:
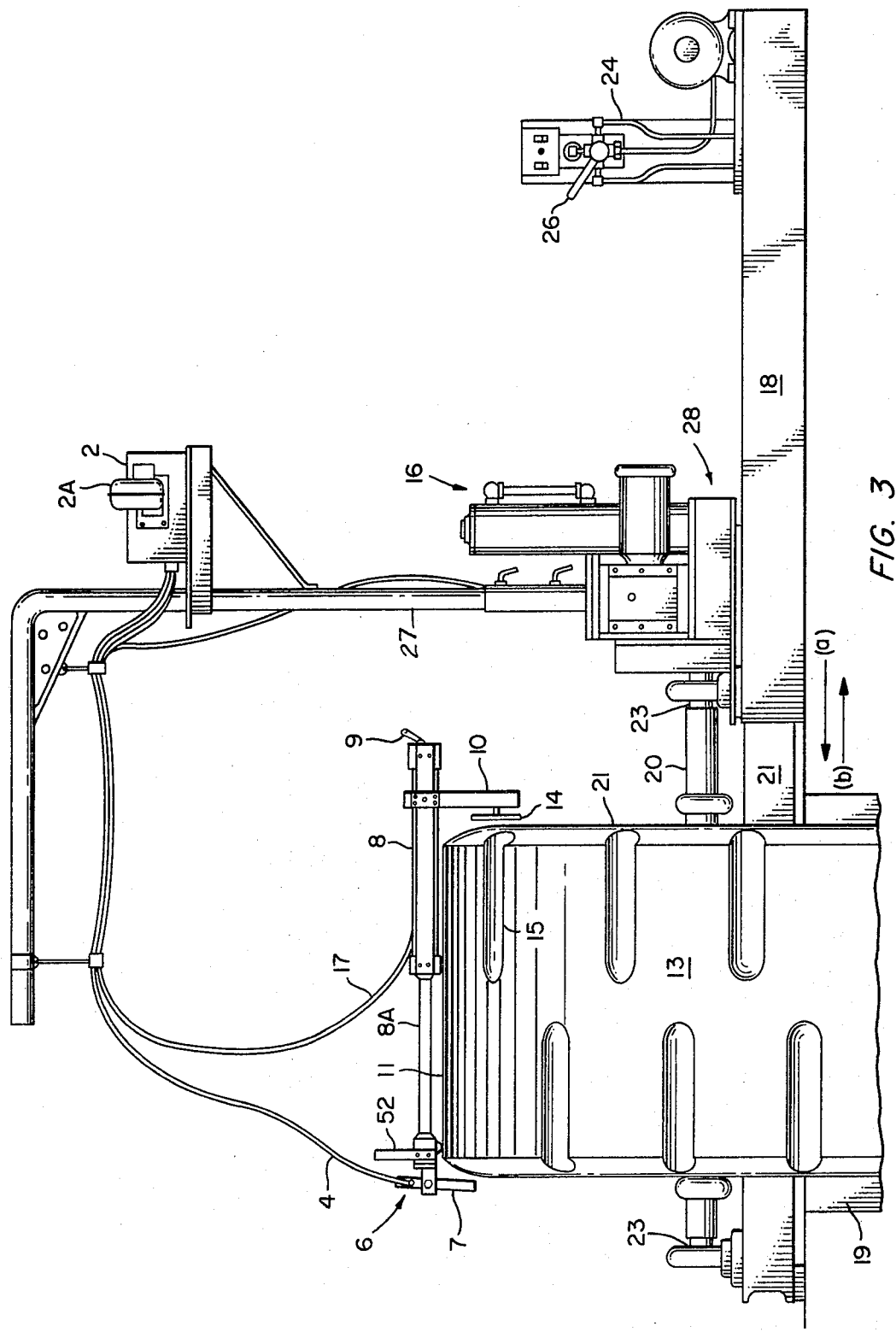
FIG. 3 is a side view of apparatus in accordance with the invention, and showing a tire mounted on said apparatus and disposed in a pit, and a grooving head positioned for grooving the tire.

With specific reference to FIG. 3, transformer 2 may include a conventional thermocouple (not shown) for regulating the temperature of grooving blade 7. In this connection it is noted that for appropriate grooving action it is desirable to hold the temperature of the cutting blade at a substantially constant value depending on the tire characteristics.

Tire 13 is disposed on roller assembly 21 so as to rest on rollers 20 and 22 as shown in FIG. 4. The roller assembly, initially disposed partially across pit 19, is actuated in a forward direction (a) by hydraulic means 24 through hand valve 26 so as to span pit 19 which receives the tire. Grooving head 6, which is supported by hydraulic cylinder 8 so as to be displaced thereby, is positioned on a point on tire tread surface 11 at which a groove is to be cut. In this connection it is to be noted that tire 13 may be disposed on roller assembly 21 with a hoist or the like when the size of the tire so dictates.

With grooving head 6 so positioned on tire tread surface 11 and blade 7 thereof heated through transformer 2 to a controlled temperature as aforenoted, hand valve 9 is operated to actuate hydraulic cylinder 8, whereby grooving head 6 is pulled across tread surface 11 of the tire a predetermined distance to cut a groove 15. Plate 14 creates an opposing pressure or force against side wall 21 of tire 13 as the blade is being pulled across the tread surface to maintain said tire in a stabilized position as will be understood by those skilled in the art.

When a groove 15 has been cut, tire 13 is indexed to another grooving position through motor and gear box 9 which rotates rollers 20 and 22 as heretofore noted. In this connection it will be understood that a template may be used to mark the position of the grooves around the circumference of the tire and the tire is indexed from one marked position to another to cut the grooves in the appropriate position.

When the entire circumference of the tire has been grooved as desired, roller assembly 21 is displaced by hydraulic means 24 in direction (b) so as to be again disposed partially across pit 19, and tire 13 is removed therefrom by a hoist as may be required for subsequent curing in a chamber or autoclave as is well known in the art.

Figure 5:
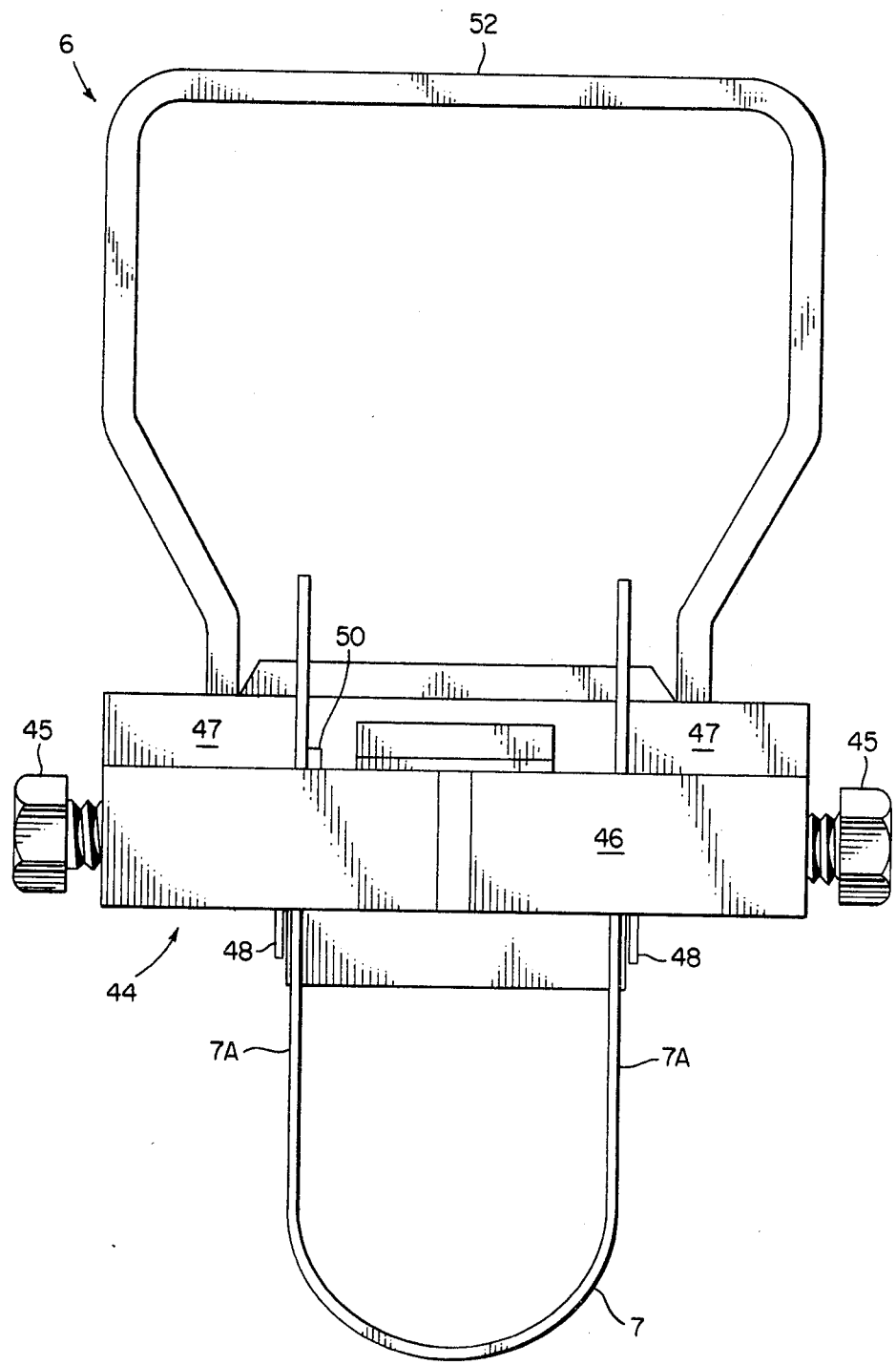
FIG. 5 is a diagrammatic representation of an adjustable grooving head in accordance with the invention.

With specific reference now to FIG. 5, the effective length and width of blade 7 and hence the depth and width of a groove 15 is adjustable by a spacer and bolt assembly designated generally by the numeral 44 and including bolts 45 and spacers 47 whereby the blade is displaced away from or toward a base 46 of grooving head 6 for groove depth adjustment and the blade legs 7A are displaced away from or toward each other for width adjustment. Grooving head 6 carries electrodes 48 connected to transformer 2 for heating blade 7 and a sensor 50 is suitably connected to the aforenoted thermocouple. A handle 52 is provided for positioning grooving head 6 as is required. It is to be noted that blade 7 is replaceable for providing grooves of various shapes and sizes as may be desired.

Figure 2:
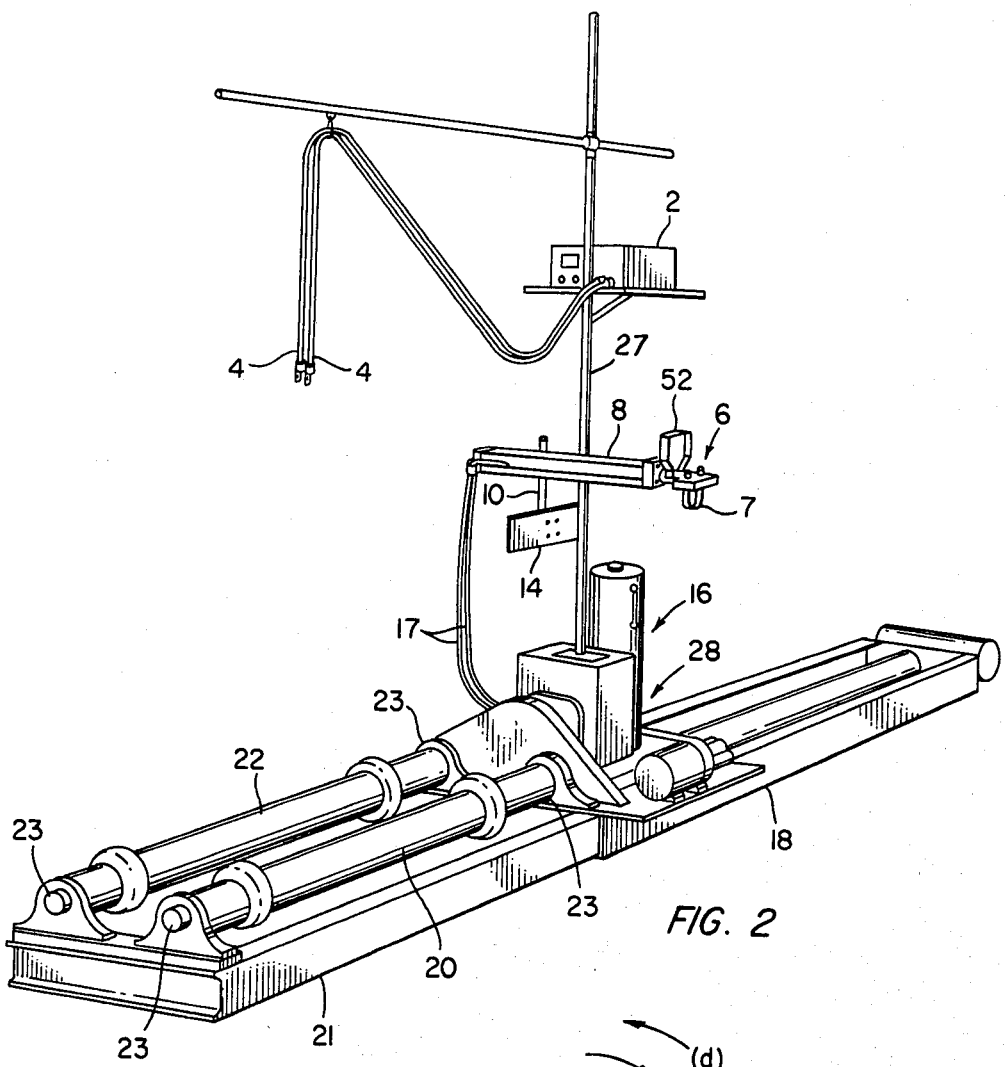
FIG. 2 is an isometric representation of apparatus in accordance with the invention.

Base plate 14, best shown in FIGS. 2 and 3, is pivotally arranged on arm 10 so as to be angularly disposed relative to side wall 21 of tire 13, whereby a groove 15 may be cut at an angle instead of straight across surface 13 of the tire as shown in the drawings, the same being accomplished by exerting an opposing angular force or pressure against the tire face when the groove is being cut. In this connection it will be noted that a conventional protractor type device (not shown) may be arranged with plate 14 to adjust the angle thereof as may be desired.

It will now be understood from the aforegoing description of the method and apparatus of the invention that the tire is first prepared and smoothed and then grooved as noted. The grooving is performed before curing the tire. With the apparatus described, and for purposes of illustration, a groove 14 inches long can be cut in the tire in 14 seconds with one pass of grooving head 6.

It will now be seen that novel apparatus and method for smoothing and grooving tires has been described. Tire 13 is placed on platform 18 which is hydraulically operated for disposing the tire over a pit, after which grooving head 6 is placed on the smoothed tread surface of the tire and hydraulically operated for cutting a groove. The tire is supported on rollers which are rotatable for indexing the tire, whereby the grooves are cut around the circumference of the tire. That is to say, after each groove is cut the tire is indexed for the next groove to be cut. After the tire has been completely grooved it is removed from the platform and cured.

The apparatus and method of the invention requires minimum manual effort for accomplishing its purposes, and thus represents a distinct improvement over apparatus and methods of the prior art.

Although a single embodiment of the invention has been illustrated and described in detail it is to be expressly understood that the invention is not limited thereto. Various changes may also be made in the design and arrangement of the parts and the steps of the method without departing from the spirit and scope of the invention as the same will now be understood by those skilled in the art.

What is claimed is:

1. A method for recapping a tire, comprising the steps of:
    preparing the tire tread surface including buffing, skiving and filling tread cuts;
    smoothing the prepared tire tread surface including applying prepared rubber around the circumference of the tread surface to a predetermined depth;
    supporting the tire on rotatable means, with portions of the tire beads contacting the rotatable means and the rotatable means thereby carrying the weight of the tire for rendering the tire rotatable therewith;
    carrying the rotatable means on longitudinally displaceable means and longitudinally displacing the longitudinally displaceable means for spanning a pit and thereby suspending the tire in the pit;
    rotating the rotatable means for indexing the tire suspended in the pit to a predetermined position;
    positioning a displaceable grooving head having a grooving blade on the tread surface of the indexed tire;
    heating the grooving blade and displacing the grooving head across the tread surface of the tire with the grooving blade thereupon cutting a groove; and
    curing the tire after grooves have been cut around the circumference thereof.

2. A method for recapping a tire as described by claim 1, wherein applying prepared rubber around the circumference of the tread surface includes:
    applying prepared rubber strips of a predetermined thickness and substantially wider than the tread design of the tire to the tire tread surface;
    splicing the strips whereby the opposite ends thereof are joined;
    rolling and cementing the spliced strips on the tire tread surface; and
    trimming the strips to conform to the tread design.

3. A method for recapping a tire as described by claim 2, wherein:
    the strips are supplied, spliced, rolled and cemented and trimmed one at a time until a predetermined thickness of rubber is attained.

4. A method for recapping a tire as described by claim 1, including:
rotating the rotatable means at a relatively slow speed for indexing the tire.

5. A method for recapping a tire as described by claim 1, including:
stabilizing the supported tire in a predetermined position for displacing the grooving head across the tread surface of the tire in a predetermined direction.

6. A method for recapping a tire as described by claim 1, including:
adjusting the displacement of the grooving head for adjusting the length of the groove.

7. A method for recapping a tire as described by claim 1, including:
adjusting the grooving blade in the grooving head for adjusting the depth and the width of the groove.

8. A method for recapping a tire as described by claim 1, including:
controlling the temperature of the heated grooving blade.

* * * * *